United States Patent [19]

DuBois et al.

[11] Patent Number: 5,584,235
[45] Date of Patent: Dec. 17, 1996

[54] FOOD STEAMER FLAVORING SUPPORT

[75] Inventors: Craig A. DuBois, Trumbull; Robert C. Kass, Fairfield, both of Conn.

[73] Assignee: Black & Decker Inc., Newark, Del.

[21] Appl. No.: 574,065

[22] Filed: Dec. 18, 1995

[51] Int. Cl.⁶ .................. A47J 37/00; A47J 27/04
[52] U.S. Cl. .................. 99/413; 99/482; 126/369; 219/401
[58] Field of Search .................. 99/410, 413, 415, 99/446, 450, 482; 126/369; 219/401

[56] References Cited

U.S. PATENT DOCUMENTS

| 77,702 | 5/1868 | Zopff .................. 126/369 |
| 1,245,711 | 11/1917 | Happer . |
| 1,245,712 | 11/1917 | Happer . |
| 2,932,293 | 4/1960 | Rassieur .................. 126/369 |
| 2,967,023 | 1/1961 | Huckabee . |
| 3,078,783 | 2/1963 | Lee, Sr. . |
| 3,088,393 | 5/1963 | Huckabee . |
| 4,397,298 | 8/1983 | Abell .................. 126/369 |
| 4,462,308 | 7/1984 | Wang .................. 99/413 |
| 4,574,776 | 3/1986 | Hidle .................. 126/369 |
| 4,650,968 | 3/1987 | Williams .................. 219/401 |
| 4,762,056 | 8/1988 | Virag .................. 99/345 |
| 5,176,067 | 1/1993 | Higgins .................. 99/340 |
| 5,191,831 | 3/1993 | Walden .................. 99/446 |
| 5,275,094 | 1/1994 | Naft .................. 99/416 |
| 5,363,748 | 11/1994 | Boehm et al. .................. 99/372 |
| 5,400,701 | 3/1995 | Sham .................. 99/410 |

*Primary Examiner*—David Scherbel
*Assistant Examiner*—Reginald L. Alexander
*Attorney, Agent, or Firm*—Barry E. Deutsch

[57] ABSTRACT

A food steamer having a base, a combined support and collector, and a cooking bowl. The base has a heater and a reservoir for holding water to be heated into steam. The cooking bowl is mounted on top of the base and has a bottom with holes. The combined support and collector has a frame and a screen. The frame is mounted to the base between the heater and the cooking bowl. The frame has a center aperture with the screen located therein for supporting flavoring items thereon. The frame has raised walls to form a condensed steam holding area for holding all condensed steam that has traveled into and then back out of the holes in the cooking bowl.

11 Claims, 1 Drawing Sheet

FOOD STEAMER FLAVORING SUPPORT

BACKGROUND OF THE INVENTION

1. Field of the Invention

The present invention relates to food steamers and, more particularly, to adding flavoring to food being steamed.

2. Prior Art

U.S. Pat. No. 5,275,094 discloses a food steamer having a base, a food cooker, and an insert between the two that collects all condensed steam that has traveled into and then back out of holes in a bottom of the cooking bowl. U.S. Pat. No. 3,078,783 discloses a pressure cooker with a well that holds both water. The well is used to turn water into steam and food flavoring substance is burned in the well during cooking. U.S. Pat. No. 4,762,056 discloses a container for storing and also cooking food and flavorings together. Other relevant art include the following:
U.S. Pat. No. : 1,245,711 U.S. Pat. No. : 1,245,712 U.S. Pat. No. : 2,967,023 U.S. Pat. No. : 3,088,393 U.S. Pat. No. : 3,117,510 U.S. Pat. No. : 4,509,412 U.S. Pat. No. : 5,097,753 U.S. Pat. No. : 5,176,067 U.S. Pat. No. : 5,191,831 U.S. Pat. No. : 5,363,748

SUMMARY OF THE INVENTION

In accordance with one embodiment of the present invention, a food steamer is provided comprising a base, a combined support and collector, and a cooking bowl. The base has a heater and a first holding area for holding water to be heated into steam. The combined support and collector is mounted to the base above the heater and the first holding area. The combined support and collector has a frame with a general ring shape and a support screen. A bottom of the frame is imperforate except for a center aperture to thereby form a second holding area around the second aperture for collecting and holding condensed steam. The screen is located in the center aperture for supporting flavoring items thereon. The cooking bowl is mounted on top of the base and has a bottom with holes therethrough only above the second holding area.

In accordance with another embodiment of the present invention, in a food steamer having a first area for holding water to be turned into steam, a container for holding food to be steam cooked and a separate second area for collecting all condensed steam that has passed through the container, the improvement comprises a support for holding flavoring items. The support is located in a path of the steam between the first area for holding water to be turned into steam and the container. The support is spaced from the first and second areas and the container.

In accordance with another embodiment of the present invention, a flavoring support for a food steaming cooker is provided comprising a frame, at least one screen, and means for mounting the frame. The frame has at least one steam passage aperture therethrough and raised walls around the at least one steam passage aperture. The walls format least one condensed steam holding area. The at least one screen is connected to the frame at the at least one aperture for supporting flavoring items thereon. The means for mounting the frame is adapted to mount the frame between a food holding container and a base having a heater and a water holding area.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENT

Figures 1, 2:
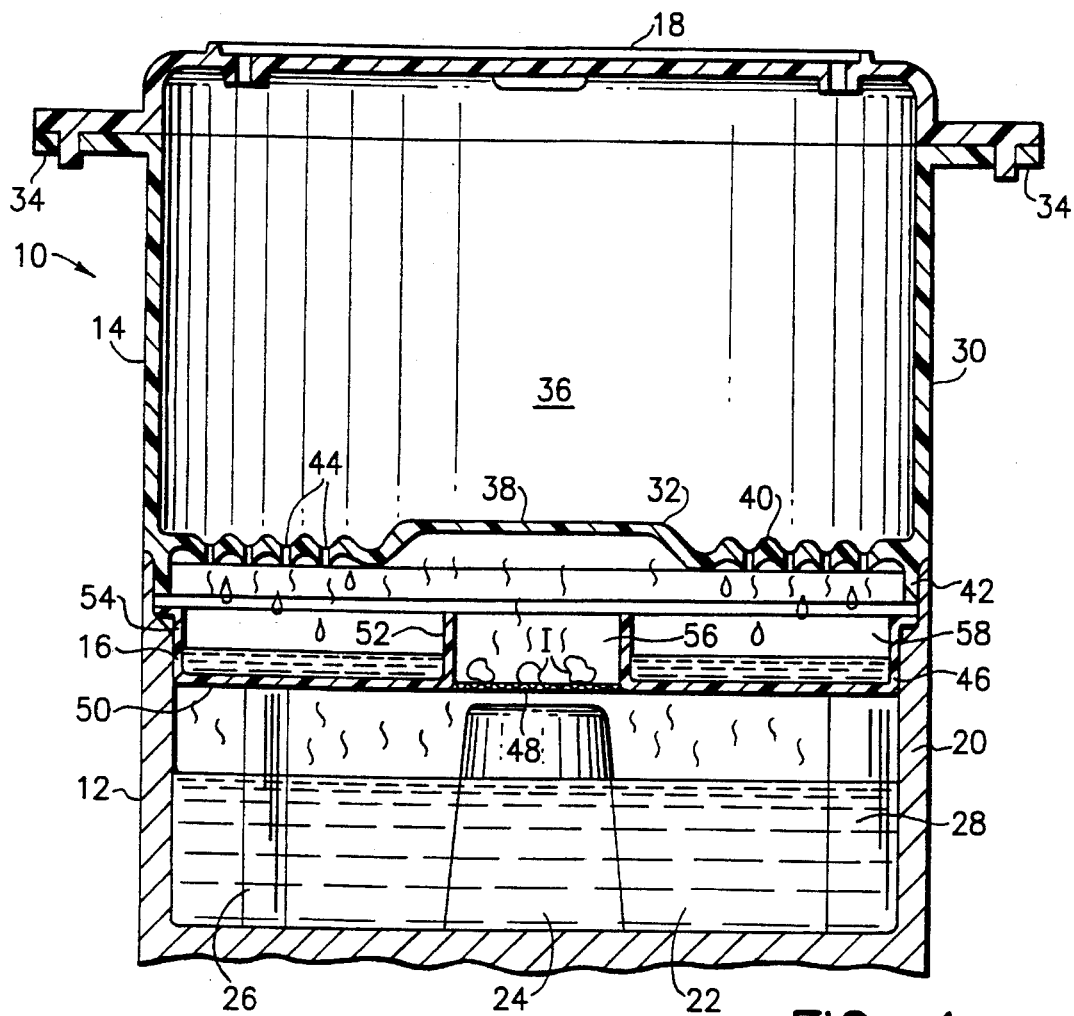
FIG. 1 is a partial cross-sectional view of a food steamer incorporating features of the present invention.
FIG. 2 is a plan top view of the combined support and collector used in the food steamer shown in FIG. 1

Referring to FIG. 1, there is shown a partial cross-sectional view of a food steamer 10 incorporating features of the present invention. Although the present invention will be described with reference to the single embodiment shown in the drawings, it should be understood that features of the present invention can be embodied in many forms of alternate embodiments. In addition, any suitable size, shape or type of elements or materials could be used.

The steamer 10 generally comprises a base 12, a cooking bowl 14, a combined support and collector 16, and a cover 18. The base 12 has a wall 20 that defines a first holding area or reservoir 22 for holding a liquid, such as water, to be heated into steam. A heating element or heater 24 is mounted in the reservoir 22. The heating element 24 is adapted to heat liquid in the reservoir 22 into steam. Thus, the reservoir 22 is also a boiling chamber. The heating element 24 is centrally mounted in the reservoir 22. In alternate embodiments any suitable type of heating element could be used. The base 12 also preferably comprises an ON/OFF switch (not shown) and an electrical cord (not shown) for connecting the heating element 24 to a power source. The wall 20 also includes support feet 26 (only one of which is shown) and a support pad 28.

The cooking bowl 14 is removably supported on the top of the base 12. The bowl 14 includes an outer wall 30, a bottom 32, and extensions 34 on the top of the wall 30. The walls 30, 32 form a food holding area 36. The bottom 32 includes a center closed area or imperforate section 38, a perforated section 40, and a mounting rim 42. The mounting rim 42 combines with the top of the base 12 to stably mount the bowl 14 on top of the base 12. However, any suitable means could be provided to removably connect the bowl with the base. The perforated section 40 has a general circular ring shape with the imperforate center area 38 in the middle. The perforated section 40 has a wavy surface with holes 44 therethrough. The center area 38 does not have holes. In alternate embodiments, other types of bowls could be used. The cover 18 is removably mounted to the top of the bowl 14.

Referring also to FIG. 2, the combined support and collector 16 generally comprises a frame 46 and a support screen 48. The frame 46 is a one-piece member having a general ring shape. The frame 46 has a bottom wall 50, an inner wall 52 and an outer wall 54. The inner wall 52 defines a center aperture 56. The walls 50, 52, 54 are imperforate to thereby form a second holding area 58. The screen 48 is attached to the frame 46 at the bottom of the center aperture 56. In an alternate embodiment, the screen could be integrally formed with the frame 46. The collector 16 is mounted inside the base 12 and is supported on the base 12 by a rim 60 and the pad 28 and feet 26. Because the heating element 24, aperture 56 and center area 38 of the bottom of the bowl are all centrally located, they are vertically aligned with one another. Likewise, the wavy perforated section 40 of the bottom of the bowl is aligned over the second holding area 58.

The principal difference between the present invention and the prior art food steamer disclosed in U.S. Pat. No. 5,275,094, is in regard to the collector 16. In the present invention the collector provides two functions. First, similar to the ring-like member in U.S. Pat. No. 5,275,094, the collector 16 is adapted to allow steam to pass through the center aperture 56 from the reservoir 22 and into the bowl 14 through the holes 44. Condensed steam in the bowl 14 can exit through the holes 44 and be collected in the second holding area 58. This separate holding area for condensed steam and drippings from the cooking food reduces the build-up of any unwanted residue on the heating element 24 and reduces the need for cleaning of the boiling chamber or reservoir 22. The second function is the ability of the collector 16 to support items I on the screen 48 in the path of steam flow through the center steam aperture 56. The items I can include herbs, spices, or any other suitable type of food flavoring item.

With the increase in the trend of healthier eating there has been an increase in the use of steamers. Steaming food provides an easy way to cook vegetables without losing their nutritional value. To improve the taste, toppings or spices have been added after cooking. However, these toppings are not absorbed into the food. They are only mixed while being eaten.

The present invention provides a space to put herbs and spices so that they will be incorporated into the steam as the food is being cooked. This space is located in the opening where steam flows from the boiling chamber 22 into the food area. By using the inner wall 52 to form the chamber to hold the items I, only the screen 48 needs to be added. None of the other components of the steamer 10 need to be redesigned. The screen 48 is able to hold the items I and also allow the steam to pass therethrough. The steamer 10 can be used with or without flavoring items and the steamer 10 does not need to be reconfigured when used with or without flavoring items. The advantage of putting the herbs and spices in the steamer while the food is cooking is that the foods can now absorb the flavors throughout as they cook. The addition of the herbs and spices allows the cook to experiment with new flavors to enhance the taste of fresh vegetables and other food. By separating the herbs and spices from the boiling water, cleaning of the boiling chamber 22 is reduced and the build up of any unwanted reside at the heater 24 is reduced.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A food steamer comprising:

a base having a heater and a first holding area for holding water to be heated into steam;

a combined support and collector mounted to the base above the heater and the first holding area, the combined support and collector having a frame with a general ring shape and a support screen, a bottom of the frame being imperforate except for a center aperture to thereby form a second holding area around the center aperture for collecting and holding condensed steam, the screen being located in the center aperture for supporting flavoring items therein; and a cooking bowl mounted on top of the base and having a bottom with holes therethrough, the holes being located only above the second holding area.

2. A steamer as in claim 1 wherein the frame has a raised wall around the center aperture and the screen is located at a bottom of the wall such that the wall and screen form a holding chamber.

3. A steamer as in claim 1 wherein the bottom of the cooking bowl has a center imperforate area located directly above the center aperture of the combined support and collector such that condensed steam is prevented from falling onto flavoring items located on the screen.

4. A steamer as in claim 1 further comprising means for substantially preventing condensed steam from contacting the flavoring items located on the screen.

5. In a food steamer having a housing including a first area for holding water to be turned into steam, a container for holding food to be steam cooked vertically disposed above said first area, and a separate second area vertically disposed between said first area and said container for collecting all condensed steam that has traveled into and then back out of holes in a bottom of the container, wherein the improvement comprises:

a support for holding flavoring items, the support being located in a path of the steam flow between the first area for holding water to be turned into steam and the container, the support being spaced vertically between said first area and the container, said support including at least one opening for enabling steam to flow from said first area to said container.

6. A steamer as in claim 5 wherein the support comprises a frame and a screen, and said frame includes said opening and said screen is disposed within said opening for supporting the flavoring items in the path of flow of said steam from said first area into said container.

7. A steamer as in claim 6 wherein the frame has a center aperture and the screen is located inside the aperture.

8. A steamer as in claim 7 wherein the frame has raised walls around the center aperture and its perimeter to thereby form the second area for collecting all of the condensed steam.

9. A steamer as in claim 8 wherein the bottom of the container has a center area located directly above the center aperture of the frame that does not have holes therethrough such that condensed steam cannot fall onto flavoring items located on the screen.

10. A steamer as in claim 5 further comprising means for preventing condensed steam from contacting the flavoring items located on the support.

11. A flavoring support for a food steaming cooker, said cooker including a base having a heater and a water holding area, and a food holding container, the flavoring support comprising:

a frame having at least one steam passage aperture there-through and raised walls around the at least one steam passage aperture, the walls forming at least one condensed steam holding area;

at least one screen connected to the frame at the at least one aperture for supporting flavoring items thereon; and means for mounting the frame between a said food holding container and said base having the heater and the water holding area, said one aperture and screen being interposed in the steam flow path from said water holding area to said food holding container.

\* \* \* \* \*